United States Patent
Marchini et al.

(10) Patent No.: US 10,793,655 B2
(45) Date of Patent: Oct. 6, 2020

(54) SOFT POLYOLEFIN COMPOSITION

(71) Applicant: BASELL POLIOLEFINE ITALIA S.R.L., Milan (IT)

(72) Inventors: Roberta Marchini, Ferrara (IT); Stefano Spataro, Ferrara (IT); Stefano Pasquali, Ferrara (IT); Gianluca Musacchi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 87 days.

(21) Appl. No.: 16/087,731

(22) PCT Filed: Mar. 23, 2017

(86) PCT No.: PCT/EP2017/056977
§ 371 (c)(1),
(2) Date: Sep. 24, 2018

(87) PCT Pub. No.: WO2017/162817
PCT Pub. Date: Sep. 28, 2017

(65) Prior Publication Data
US 2019/0112402 A1  Apr. 18, 2019

(30) Foreign Application Priority Data

Mar. 24, 2016 (EP) .................................. 16162172

(51) Int. Cl.
| | |
|---|---|
| C08L 23/20 | (2006.01) |
| C08F 210/16 | (2006.01) |
| B65D 53/06 | (2006.01) |
| C09K 3/10 | (2006.01) |
| C08F 210/02 | (2006.01) |
| C08F 210/08 | (2006.01) |
| B65D 53/00 | (2006.01) |

(52) U.S. Cl.
CPC ............ *C08F 210/16* (2013.01); *B65D 53/06* (2013.01); *C08F 210/02* (2013.01); *C08F 210/08* (2013.01); *C08L 23/20* (2013.01); *C09K 3/1006* (2013.01); *B65D 53/00* (2013.01); *C08F 2500/03* (2013.01); *C08F 2500/07* (2013.01); *C08F 2500/08* (2013.01); *C08F 2500/17* (2013.01); *C08F 2800/20* (2013.01); *C08L 2205/025* (2013.01); *C08L 2205/035* (2013.01); *C09K 2200/062* (2013.01); *C09K 2200/0617* (2013.01)

(58) Field of Classification Search
CPC ............ C09K 3/1006; C09K 2200/062; C08F 210/08; C08F 210/02; C08F 210/16; C08F 2800/20; C08F 2500/08; C08F 2500/17; C08F 2500/07; B65D 53/06; B65D 53/00; C08L 23/20; C08L 23/06; C08L 23/142; C08L 2205/035; C08L 2205/025

See application file for complete search history.

(56) References Cited

U.S. PATENT DOCUMENTS

| | | | |
|---|---|---|---|
| 4,791,143 A | 12/1988 | Tanaka et al. | |
| 4,918,111 A | 4/1990 | Tanaka et al. | |
| 4,983,742 A * | 1/1991 | Yusawa et al. | C08K 3/22 524/436 |
| 5,486,558 A * | 1/1996 | Lee | C08L 23/06 524/241 |
| 6,861,478 B2 | 3/2005 | Yasaka | |
| 7,981,993 B2 | 7/2011 | Pellegatti et al. | |
| 9,505,958 B2 | 11/2016 | Akai et al. | |
| 10,017,591 B2 | 7/2018 | Akai et al. | |
| 10,214,640 B2 * | 2/2019 | Marchini et al. | B65D 41/0435 |
| 2011/0097523 A1* | 4/2011 | Bernal-Lara et al. | C08L 23/142 428/35.2 |
| 2011/0190450 A1 | 8/2011 | De Palo et al. | |
| 2015/0051350 A1 | 2/2015 | Ferrari et al. | |

FOREIGN PATENT DOCUMENTS

| | | |
|---|---|---|
| EP | 1364990 A2 | 11/2003 |
| EP | 2631271 A1 | 8/2013 |
| JP | S63213531 A | 9/1988 |
| JP | 2002146343 A | 5/2002 |
| JP | 2012503680 A | 2/2012 |
| WO | 2009000637 A1 | 12/2008 |
| WO | 2010069775 A1 | 6/2010 |
| WO | 2014042249 A1 | 3/2014 |

OTHER PUBLICATIONS

International Search Report and Written Opinion dated Apr. 18, 2017 (dated Apr. 18, 2017) for Corresponding PCT/EP2017/056977.

* cited by examiner

*Primary Examiner* — Nathan M Nutter

(57) ABSTRACT

The present disclosure provides a polyolefin composition made from or containing:
A) from about 60 to about 89% by weight based upon the total weight of the polyolefin composition of a copolymer of butene-1 with ethylene having a copolymerized ethylene content of up to about 18% by mole based upon the molar composition of the copolymer, and no melting peak detectable at the DSC at the second heating scan; and
B) from about 11 to about 40% by weight based upon the total weight of the polyolefin composition of an ethylene polymer having density of from about 0.900 to about 0.970 g/cm³, measured according to ISO 1183 at 23° C.;
wherein the amounts of A) and B) are referred to the total weight of A)+B) and the DSC second heating scan is carried out with a heating rate of 10° C. per minute. The composition is useful for preparing gaskets.

12 Claims, No Drawings

SOFT POLYOLEFIN COMPOSITION

This application is the U.S. National Phase of PCT International Application PCT/EP2017/056977, filed Mar. 23, 2017, claiming benefit of priority to European Patent Application No. 16162172.7, filed Mar. 24, 2016, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a soft and thermoplastic polyolefin composition having low values of shore hardness in combination with good tensile and elastic properties.

BACKGROUND OF THE INVENTION

Polyolefin compositions having high softness and a good thermoplastic behavior are used in many application fields. The utility of such polyolefins results from the chemical inertia, mechanical properties and nontoxicity of those polyolefins.

Some polyolefin compositions have crystalline and amorphous portions, in various relative amounts.

In some polyolefins, the crystalline and amorphous portions are present in the same polymer chain or distinct phases.

The chemical composition of such portions, their relative amounts and the way such portions are combined in the polyolefin composition can determine different sets of properties.

For some compositions, it is challenging to balance softness, flexibility and thermoplastic behavior.

If such properties are balanced, the polyolefins compositions would prove useful for preparing gaskets for closures, capable of providing a tight and durable seal.

For some gasket applications, a Shore A hardness range from about 70 to about 100 is recommended.

SUMMARY OF THE INVENTION

In a general embodiment, the present disclosure provides a polyolefin composition made from or containing:
A) from about 60 to about 89% by weight based upon the total weight of the polyolefin composition, alternatively from about 65 to about 85% by weight, alternatively from about 65 to about 82% by weight, of a copolymer of butene-1 with ethylene having a copolymerized ethylene content of up to about 18% by mole based upon the molar composition of the copolymer, and no melting peak detectable at the DSC at the second heating scan and
B) from about 11 to about 40% by weight based upon the total weight of the polyolefin composition, alternatively from about 15 to about 35% by weight, alternatively from about 18 to about 35% by weight, of an ethylene polymer having a density of from about 0.900 to about 0.970 g/cm$^3$, alternatively about 0.900 to about 0.965 g/cm$^3$, measured according to ISO 1183 at 23° C.;
wherein the amounts of A) and B) refer to the total weight of A)+B) and the DSC second heating scan is carried out with a heating rate of 10° C. per minute.

In some embodiments, the composition has high softness (a Shore A value of lower than about 90), good tensile properties (an elongation at break of about 900—about 1000%) and elastic properties (a compression set at 23° C. of lower than about 60) while maintaining a thermoplastic behavior from the presence of a crystalline fraction, as evidenced by the melting enthalpy values.

DETAILED DESCRIPTION OF THE INVENTION

In some embodiments, the polyolefin composition has a melting temperature $T_m$ which is equal or close to the melting temperature $T_m$ of the component B), alternatively from about 105° C. to about 135° C., alternatively from about 105° C. to about 125° C., alternatively from about 110° C. to about 115° C.

In some embodiments, a single melting peak is detected in the second DSC scan of the polyolefin composition in the temperature range.

If multiple melting peaks are detected, the temperature of the most intense melting peak in the temperature range is to be taken as the $T_m$ value for both component B) and the polyolefin composition made from or containing A) and B).

In some embodiments, the $\Delta H_{fus}$ value for the polyolefin composition is determined by the area of the melting peak or the total area of the melting peaks (if more than one) in the DSC temperature range from about 105° C. to about 135° C.

In some embodiments, the polyolefin composition has a $\Delta H_{fus}$, measured by DSC at the second heating scan, of from about 7 to about 35 J/g, alternatively from about 8 to about 28 J/g.

In some embodiments, the MIE of the compositions is from about 0.5 to about 8 g/10 min., where MIE is the melt flow index at 190° C. with a load of 2.16 kg, determined according to ISO 1133.

In some embodiments, the Shore A values for the composition are lower than about 90, alternatively equal to or lower than about 88, the lower limit being of about 60.

In some embodiments, the Shore D values are equal to or lower than about 20, alternatively from about 20 to about 5, alternatively lower than about 20, alternatively from lower than about 20 to about 5.

The butene-1 copolymer component A) immediately after it has been melted and cooled does not show a melting peak at the second heating scan. In other words, the butene-1 copolymer shows no melting temperature attributable to polybutene-1 crystallinity (TmII)$_{DSC}$, measured after cancelling the thermal history of the sample according to the DSC method described herein. However, the butene-1 copolymer is crystallizable. That is, after about 10 days, the polymer shows a measurable melting point and a melting enthalpy measured by DSC.

In some embodiments, the butene-1 copolymer component A) has at least one of the following additional features:
  a MIE of from about 0.5 to about 3 g/10 min.;
  a lower limit of the copolymerized ethylene content of about 12% by mole based upon the molar composition of the copolymer;
  a Shore A value equal to or lower than about 80, alternatively equal to or lower than about 70, alternatively from about 80 to about 40, alternatively from about 70 to about 40;
  a Shore D value equal to or lower than about 20, alternatively from about 20 to about 5, alternatively lower than about 20, alternatively from lower than about 20 to about 5;
  a Mw/Mn value, where Mw is the weight average molar mass and Mn is the number average molar mass, both measured by GPC, equal to or lower than about 3, alternatively from about 3 to about 1.5;

a tension set of less than about 30% at 100% of deformation at 23° C. (ISO 2285), alternatively equal to or less than about 20%, wherein the lower limit is about 5;

a percentage of butene-1 units in the form of isotactic pentads (mmmm %) greater than about 80%, alternatively equal to or greater than about 85%, alternatively equal to or greater than about 90%, wherein the upper limit is about 99%;

a tensile stress at break, measured according to ISO 527, of from about 3 MPa to about 20 MPa, alternatively from about 4 MPa to about 13 MPa;

a tensile elongation at break, measured according to ISO 527, of from about 550% to about 1000%; alternatively from about 700% to about 1000%;

an intrinsic viscosity (I.V.) equal to or higher than about 1 dl/g; alternatively equal to or higher than about 1.5 dl/g, wherein the upper limit is about 3 dl/g;

a crystallinity of less than about 30% measured via X-ray, alternatively of less than about 20%;

a density of about 0.895 g/cm$^3$ or less, alternatively about 0.875 g/cm$^3$ or less; wherein the lower limit is about 0.86 g/cm$^3$; and a content of xylene insoluble fraction at 0° C. of less than about 15% by weight based upon the total weight of the copolymer, wherein the lower limit is about 0%.

In some embodiments, the butene-1 copolymer component A) is obtained by polymerizing the monomer(s) in the presence of a metallocene catalyst system obtainable by contacting:

a stereorigid metallocene compound;

an alumoxane or a compound capable of forming an alkyl metallocene cation; and, optionally, an organo aluminum compound.

In some embodiments, the stereorigid metallocene compound belongs to the following formula (I):

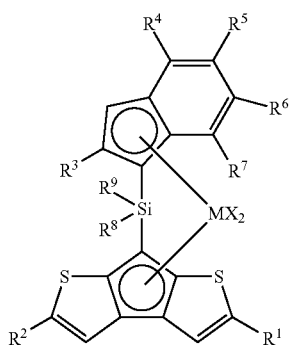

wherein:

M is an atom of a transition metal selected from those belonging to Group 4 of the Periodic Table of Elements; alternatively M is zirconium;

X, equal to or different from each other, is a hydrogen atom, a halogen atom, a R, OR, OR'O, OSO$_2$CF$_3$, OCOR, SR, NR$_2$ or PR$_2$ group wherein R is a linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radical, optionally containing heteroatoms belonging to Groups 13-17 of the Periodic Table of the Elements; and R' is a C$_1$-C$_{20}$-alkylidene, C$_6$-C$_{20}$-arylidene, C$_7$-C$_{20}$-alkylarylidene, or C$_7$-C$_{20}$-arylalkylidene radical;

R$^1$, R$^2$, R$^5$, R$^6$, R$^7$, R$^8$ and R$^9$, equal to or different from each other, are hydrogen atoms, or linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing heteroatoms belonging to Groups 13-17 of the Periodic Table of the Elements; or R$^5$ and R$^6$, or R$^8$ and R$^9$ can optionally form a saturated or unsaturated, 5 or 6 membered rings, providing that at least one of R$^6$ or R$^7$ is a linear or branched, saturated or unsaturated C$_1$-C$_{20}$-alkyl radical, optionally containing heteroatoms belonging to Groups 13-17 of the Periodic Table of the Elements;

R$^3$ and R$^4$, equal to or different from each other, are linear or branched, saturated or unsaturated C$_1$-C$_{20}$-alkyl radicals, optionally containing heteroatoms belonging to Groups 13-17 of the Periodic Table of the Elements.

In some embodiments, X is a hydrogen atom, a halogen atom, a OR'O or R group. In some embodiments, X is chlorine or a methyl radical. In some embodiments, the ring bears C$_1$-C$_{20}$ alkyl radicals as substituents. In some embodiments, R$^6$ or R$^7$ is a C$_1$-C$_{10}$-alkyl radical. In some embodiments, R$^3$ and R$^4$, equal to or different from each other, are C$_1$-C$_{10}$-alkyl radicals. In some embodiments, R$^3$ is a methyl or ethyl radical. In some embodiments, R$^4$ is a methyl, ethyl or isopropyl radical.

In some embodiments, the compounds of formula (I) have the general formula (Ia):

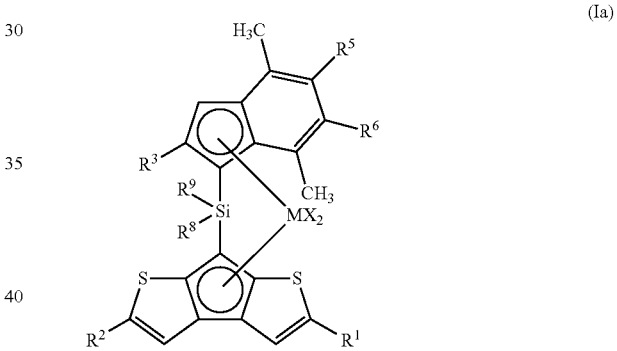

Wherein:

M, X, R$^1$, R$^2$, R$^5$, R$^6$, R$^8$ and R$^9$ have been described above;

R$^3$ is a linear or branched, saturated or unsaturated C$_1$-C$_{20}$-alkyl radical, optionally containing heteroatoms belonging to groups 13-17 of the Periodic Table of the Elements; alternatively R$^3$ is a C$_1$-C$_{10}$-alkyl radical; alternatively R$^3$ is a methyl, or ethyl radical.

In some embodiments, the metallocene compounds are selected from the group consisting of dimethyl silanediyl{(1-(2,4,7-trimethylindenyl)-7-(2,5-dimethyl-cyclopenta[1,2-b:4,3-b']-dithiophene)}Zirconium dichloride and dimethylsilanediyl{(1-(2,4,7-trimethylindenyl)-7-(2,5-dimethyl-cyclopenta[1,2-b:4,3-b']-dithiophene)}Zirconium dimethyl.

In some embodiments, the alumoxanes are selected from the group consisting of methylalumoxane (MAO), tetra-(isobutyl)alumoxane (TIBAO), tetra-(2,4,4-trimethylpentyl)alumoxane (TIOAO), tetra-(2,3-dimethylbutyl)alumoxane (TDMBAO) and tetra-(2,3,3-trimethylbutyl)alumoxane (TTMBAO).

In some embodiments, the alkylmetallocene cation is prepared from compounds of formula D$^+$E$^-$, wherein D$^+$ is a Brønsted acid, able to donate a proton and to react irreversibly with a substituent X of the metallocene of formula (I) and E$^-$ is a compatible anion, which is able to stabilize the active catalytic species originating from the reaction of the two compounds, and which is able to be removed by an olefinic monomer. In some embodiments, the anion E⁻ is made from or contains one or more boron atoms.

In some embodiments, the organo-aluminum compounds are selected from the group consisting of trimethylaluminum (TMA), triisobutylaluminium (TIBAL), tris(2,4,4-trimethylpentyl)aluminum (TIOA), tris(2,3-dimethylbutyl)aluminium (TDMBA) and tris(2,3,3-trimethylbutyl)aluminum (TTMBA).

In some embodiments, the catalyst system and the polymerization processes employing such catalyst system are as disclosed in Patent Cooperation Treaty Publication Nos. WO2004099269 and WO2009000637, both incorporated herein by reference.

In some embodiments, the polymerization process for the preparation of the butene-1 copolymer component A) is carried out via slurry polymerization using as diluent a liquid inert hydrocarbon. In some embodiments, the polymerization process for the preparation of the butene-1 copolymer component A) is carried out via solution polymerization. In some embodiments, liquid butene-1 is the reaction medium. In some embodiments, the polymerization process occurs in the gas-phase, operating in one or more fluidized bed or mechanically agitated reactors.

In some embodiments, the polymerization temperature is from about −100° C. to about 200° C., alternatively from about 20° C. to about 120° C., alternatively from about 40° C. to about 90° C., alternatively from about 50° C. to about 80° C.

In some embodiments, the polymerization pressure is between about 0.5 bar and about 100 bar.

In some embodiments, the polymerization is carried out in one or more reactors that can work under same or different reaction conditions such as concentration of molecular weight regulator, comonomer concentration, temperature, and pressure.

In some embodiments, the ethylene polymer B) is selected from the group consisting of HDPE (High Density Polyethylene, having a density from about 0.935 to about 0.970 g/cm³, alternatively from about 0.935 to about 0.965 g/cm³), MDPE and LLDPE (Medium Density and Linear Low Density Polyethylene, having a density from about 0.915 to about 0.934 g/cm³), VLDPE (Very Low Density Polyethylene, having a density about 0.900 to about 0.914 g/cm³), and LDPE (Low Density Polyethylene). In some embodiments, the ethylene polymer B) is LDPE.

In some embodiments, the ethylene polymer B) is made from or contains mixtures of the ethylene polymers.

In some embodiments, component B) is made from or containing LDPE, wherein the LDPE is an ethylene homopolymer or an ethylene copolymer containing minor amounts of other comonomers, like butyl acrylate, prepared by high pressure polymerization using free radical initiators.

In some embodiments, component B) is made from or containing LDPE homopolymers.

In some embodiments, the density of the LDPE ranges from about 0.914 to about 0.935 g/cm³.

In some embodiments, MIE of the ethylene polymer B) is from about 0.5 to about 50 g/10 min., alternatively from about 1 to about 40 g/10 min., alternatively from about 1 to about 10 g/10 min.

In some embodiments, the melting point of the LDPE is from about 110 to about 115° C.

In some embodiments, the LDPE is available under the tradenames Escorene and Lupolen.

In some embodiments, the HDPE, MDPE LLDPE and VLDPE polymers are prepared with low pressure polymerization in the presence of a Ziegler-Natta or a single site polymerization catalyst.

In some embodiments, the Ziegler-Natta catalyst is made from or contains the reaction product of (a) an organometallic compound of Group 1, 2 or 13 of the Periodic Table of Elements with (b) a transition metal compound of Groups 4 to 10 of the Periodic Table of Elements (new notation). In some embodiments, the transition metal compound is selected from the group consisting of compounds of Ti, V, Zr, Cr and Hf. In some embodiments, the transition metal is supported on $MgCl_2$.

In some embodiments, catalysts are made from or contain the reaction product of (a) the organometallic compound of group 1, 2 or 13 of the Periodic Table of elements, with (b) a solid catalyst component made from or containing a Ti compound and an optionally electron donor compound supported on $MgCl_2$.

In some embodiments, the organometallic compounds are the aluminum alkyl compounds.

In some embodiments, HDPE is a homopolymer. In some embodiments, HDPE is a copolymer of ethylene. In some embodiments, MDPE and LLDPE are copolymers.

In some embodiments, the comonomers are selected from $C_4$-$C_{10}$ alpha-olefins having the general formula $CH_2$=CHR wherein R is an alkyl radical, linear or branched, or an aryl radical, having from 2 to 8 carbon atoms.

In some embodiments, $C_4$-$C_{10}$ alpha-olefins are butene-1, pentene-1,4-methylpentene-1, hexene-1 and octene-1.

In some embodiments, the amount of comonomers in the ethylene copolymers is from about 1 to about 40% by weight based upon the total weight of the copolymer, alternatively from about 2 to about 35% by weight.

In some embodiments, the polyolefin composition also contains additives. In some embodiments, the additives are selected from the group consisting of antioxidants, light stabilizers, heat stabilizers, colorants and fillers.

In some embodiments, the polyolefin composition contains additional polyolefins. In some embodiments, the additional polyolefins are selected from crystalline propylene homopolymers and copolymers of propylene with ethylene or a $C_4$-$C_{10}$ alpha-olefin, and elastomeric copolymers. In some embodiments, the elastomeric copolymers are copolymers of ethylene with propylene or higher alpha-olefins. In some embodiments, the higher alpha-olefins are selected from the group consisting of butene-1, hexene-1 and octene-1. In some embodiments, the ethylene copolymers are EPR or EPDM copolymers.

In some embodiments, the amount of comonomers in the propylene copolymers is from about 1 to about 15% by weight based upon the total weight of the copolymer, alternatively from about 2 to about 12% by weight.

In some embodiments, the amounts of the additional polyolefins are from about 1 to about 20% by weight based upon the total weight of the polyolefin composition, alternatively from about 3 to about 15% by weight.

In some embodiments, the polyolefin composition contains less than about 20 weight % of propylene polymers, based on the total weight of the polyolefin composition, alternatively less than about 15% by weight.

As used herein, the term "propylene polymers" refers to propylene homopolymers or polymers containing prevailing amounts of propylene. In some embodiments, the amount of propylene is about 85% by weight or more, based upon the total weight of the propylene polymer.

In some embodiments, the polyolefin composition is manufactured by mixing the components together, extruding the mixture, and pelletizing the resulting composition.

In a general embodiment, the present disclosure provides manufactured articles made of or containing the polyolefin composition.

In some embodiments, the articles are manufactured by extrusion.

In some embodiments, the manufactured articles are gaskets. In some embodiments, the gaskets are for closures. In some embodiments the closures are plastic or metal closures.

In some embodiments, the gaskets for closures are used in twist closures for containers. In some embodiments, the containers are jars and bottles. In some embodiments, the jars and bottles are made of glass or plastic materials.

In some embodiments, the twist closures are in the form of caps of a circular shape. In some embodiments, the caps are made of metal or plastics. In some embodiments, the caps host the gasket on the inner surface facing the opening in the threaded circular neck of the container.

In some embodiments, the closures are for use in food and pharmaceutical packaging.

In some embodiments, the gaskets are air and liquid tight.

In some embodiments, gaskets are prepared by a process including the following steps:
 a) laying down the polyolefin composition in the molten state on the inner surface of the closure; and
 b) forming the polyolefin composition into the gasket.

In some embodiments, the "laying down" step a) is carried out by using extruders and metering devices.

In some embodiments, the extrusion temperatures applied in step a) are from about 160° C. to about 220° C.

In some embodiments and before carrying out the "laying down" step a), the inner surface of the closure is coated with a protective film of a varnish or a lacquer.

In some embodiments, the forming step b) is carried out by compression molding the molten polyolefin composition against the inner surface of the closure.

In some embodiments, the gasket preparation process is as described in U.S. Pat. No. 5,451,360, incorporated herein by reference.

In some embodiments, the resulting gaskets can have different shapes. In some embodiments, the gasket shape is "o-ring" or flat film of variable thickness depending upon the final use of the closure.

EXAMPLES

The practice and advantages of the various embodiments, compositions and methods as provided herein are disclosed below in the following examples. These Examples are illustrative only, and are not intended to limit the scope of this disclosure in any manner whatsoever.

The following analytical methods are used to characterize the polymer compositions.

Thermal Properties (Melting Temperatures and Enthalpies

Determined by Differential Scanning Calorimetry (DSC) on a Perkin Elmer DSC-7 Instrument The melting temperatures of the butene-1 copolymer A) were determined according to the following method:
TmII (measured in second heating scan): a weighted sample (5-10 mg) obtained from the polymerization was sealed into aluminum pans and heated at 200° C. with a scanning speed corresponding to 10° C./minute. The sample was kept at 200° C. for 5 minutes to allow a complete melting of the crystallites, thereby cancelling the thermal history of the sample. Successively, after cooling to −20° C. with a scanning speed corresponding to 10° C./minute, the peak temperature was taken as crystallization temperature ($T_c$). After standing 5 minutes at −20° C., the sample was heated for the second time at 200° C. with a scanning speed corresponding to 10° C./min. In this second heating run, the peak temperature, when present is taken as the melting temperature of the polybutene-1 (PB) crystalline form II (TmII) and the area as the global melting enthalpy (ΔHfII). The butene-1 copolymer component A) of the polyolefin composition did not have a TmII peak.

In order to determine the TmI, the sample was melted, kept at 200° C. for 5 minutes and then cooled down to 20° C. with a cooling rate of 10° C./min.

The sample was then stored for 10 days at room temperature. After 10 days, the sample was subjected to DSC, cooled to −20° C., and then heated at 200° C. with a scanning speed corresponding to 10° C./min. In this heating run, the first peak temperature coming from the lower temperature side in the thermogram was taken as the melting temperature (TmI). The melting temperatures of the component B) and of the overall composition made from or containing the polymer components A) and B) were measured at the second heating scan under the same conditions as above reported for the determination of TmII of the butene-1 copolymer component A).

Both component B) and the overall composition of the examples show a single melting peak between 110 and 115° C., corresponding to the melting temperature $T_m$.

The area of such melting peak of the overall composition was taken as the melting enthalpy $\Delta H_{fus}$ of the polyolefin composition.

Flexural Elastic Modulus

According to norm ISO 178, measured 10 days after molding.

Shore A and D

According to norm ISO 868, measured 10 days after molding.

Tensile Stress and Elongation at Break

According to norm ISO 527 on compression molded plaques, measured 10 days after molding.

Tension Set

According to norm ISO 2285, measured 10 days after molding.

Compression Set

According to norm ISO 815, measured 10 days after molding;

MIE

Determined according to norm ISO 1133 with a load of 2.16 kg at 190° C.

MFRL

Determined according to norm ISO 1133 with a load of 2.16 kg at 230° C.

Intrinsic Viscosity

Determined according to norm ASTM D 2857 in tetrahydronaphthalene at 135° C.

Density

Determined according to norm ISO 1183 at 23° C.

Comonomer Contents

Determined by IR spectroscopy or by NMR.

For the butene-1 copolymers the amount of comonomer was calculated from the $^{13}$C-NMR spectra of the copolymers. Measurements were performed on a polymer solution (8-12 wt %) in dideuterated 1,1,2,2-tetrachloro-ethane at 120° C. The $^{13}$C NMR spectra were acquired on a Bruker AV-600 spectrometer operating at 150.91 MHz in the Fourier transform mode at 120° C. using a 90° pulse, 15 seconds of delay between pulses and CPD (WALTZ16) to remove $^1$H-$^{13}$C coupling. About 1500 transients were stored in 32K data points using a spectral window of 60 ppm (0-60 ppm).

Copolymer Composition

Diad distribution is calculated from $^{13}$C NMR spectra using the following relations:

$$PP = 100\, I_1/\Sigma$$

$$PB = 100\, I_2/\Sigma$$

$$BB = 100(I_3 - I_{19})/\Sigma$$

$$PE = 100(I_5 + I_6)/\Sigma$$

$$BE = 100(I_9 + I_{10})/\Sigma$$

$$EE = 100(0.5(I_{15} + I_6 + I_{10}) + 0.25(I_{14}))/\Sigma$$

Where $\Sigma = I_1 + I_2 + I_3 - I_{19} + I_5 + I_6 + I_9 + I_{10} + 0.5\,(I_{15} + I_6 + I_{10}) + 0.25\,(I_{14})$ The molar content was obtained from the diads using the following relations:

$$P(m\,\%) = PP + 0.5(PE + PB)$$

$$B(m\,\%) = BB + 0.5(BE + PB)$$

$$E(m\,\%) = EE + 0.5(PE + BE)$$

$I_1, I_2, I_3, I_5, I_6, I_9, I_6, I_{10}, I_{14}, I_{15}, I_{19}$ are integrals of the peaks in the $^{13}$C NMR spectrum (peak of EEE sequence at 29.9 ppm as reference). The assignments of these peaks were made according to J. C. Randal, *Macromol. Chem Phys.*, C29, 201 (1989), M. Kakugo, Y. Naito, K. Mizunuma and T. Miyatake, *Macromolecules*, 15, 1150, (1982), and H. N. Cheng, *Journal of Polymer Science, Polymer Physics Edition*, 21, 57 (1983), incorporated by reference herein. The data were collected in Table A (nomenclature according to C. J. Carman, R. A. Harrington and C. E. Wilkes, *Macromolecules*, 10, 536 (1977)), incorporated herein by reference.

TABLE A

| I | Chemical Shift (ppm) | Carbon | Sequence |
|---|---|---|---|
| 1 | 47.34-45.60 | $S_{\alpha\alpha}$ | PP |
| 2 | 44.07-42.15 | $S_{\alpha\alpha}$ | PB |
| 3 | 40.10-39.12 | $S_{\alpha\alpha}$ | BB |
| 4 | 39.59 | $T_{\delta\delta}$ | EBE |
| 5 | 38.66-37.66 | $S_{\alpha\gamma}$ | PEP |
| 6 | 37.66-37.32 | $S_{\alpha\delta}$ | PEE |
| 7 | 37.24 | $T_{\beta\delta}$ | BBE |
| 8 | 35.22-34.85 | $T_{\beta\beta}$ | XBX |
| 9 | 34.85-34.49 | $S_{\alpha\gamma}$ | BBE |
| 10 | 34.49-34.00 | $S_{\alpha\delta}$ | BEE |
| 11 | 33.17 | $T_{\delta\delta}$ | EPE |
| 12 | 30.91-30.82 | $T_{\beta\delta}$ | XPE |
| 13 | 30.78-30.62 | $S_{\gamma\gamma}$ | XEEX |
| 14 | 30.52-30.14 | $S_{\gamma\delta}$ | XEEE |
| 15 | 29.87 | $S_{\delta\delta}$ | EEE |
| 16 | 28.76 | $T_{\beta\beta}$ | XPX |
| 17 | 28.28-27.54 | $2B_2$ | XBX |
| 18 | 27.54-26.81 | $S_{\beta\delta} + 2B_2$ | BE, PE, BBE |
| 19 | 26.67 | $2B_2$ | EBE |
| 20 | 24.64-24.14 | $S_{\beta\beta}$ | XEX |
| 21 | 21.80-19.50 | $CH_3$ | P |
| 22 | 11.01-10.79 | $CH_3$ | B |

For the propylene copolymers the comonomer content was determined by infrared spectroscopy by collecting the IR spectrum of the sample vs. an air background with a Fourier Transform Infrared spectrometer (FTIR). The instrument data acquisition parameters were:

purge time: 30 seconds minimum;
collect time: 3 minutes minimum;
apodization: Happ-Genzel;
resolution: 2 cm$^{-1}$.

Sample Preparation

Using a hydraulic press, a thick sheet was obtained by pressing about 1 gram of sample between two aluminum foils. If homogeneity was uncertain, a minimum of two pressing operations occurred. A small portion was cut from this sheet to mold a film. The film thickness was between 0.02-0.05 cm (8-20 mils).

Pressing temperature was 180±10° C. (356° F.) and about 10 kg/cm$^2$ (142.2 PSI) pressure for about one minute. Then the pressure was released and the sample was removed from the press and cooled to room temperature.

The spectrum of a pressed film of the polymer was recorded in absorbance vs. wavenumbers (cm$^{-1}$). The following measurements were used to calculate ethylene and butene-1 content:

Area (At) of the combination absorption bands between 4482 and 3950 cm$^{-1}$ which was used for spectrometric normalization of film thickness.

If ethylene was present, Area (AC2) of the absorption band between 750-700 cm$^{-1}$ after two proper consecutive spectroscopic subtractions of an isotactic non additivated polypropylene spectrum was measured and then, if butene-1 was present, a reference spectrum of a butene-1-propylene random copolymer in the range 800-690 cm$^{-1}$ was used.

If butene-1 was present, the height (DC4) of the absorption band at 769 cm$^{-1}$ (maximum value), after two proper consecutive spectroscopic subtractions of an isotactic non additivated polypropylene spectrum was measured and then, if ethylene was present, a reference spectrum of an ethylene-propylene random copolymer in the range 800-690 cm$^{-1}$ was used.

To calculate the ethylene and butene-lcontent, calibration straight lines for ethylene and butene-1 were obtained by using reference samples of ethylene and butene-1.

Mw/Mn Determination by GPC

The determination of the means Mn and Mw, and Mw/Mn derived therefrom was carried out using a Waters GPCV 2000 apparatus, which was equipped with a column set of four PLgel Olexis mixed-gel (Polymer Laboratories) and an IR4 infrared detector (PolymerChar). The dimensions of the columns were 300×7.5 mm and their particle size was 13 μm. The mobile phase used was 1-2-4-trichlorobenzene (TCB) and its flow rate was kept at 1.0 ml/min. The measurements were carried out at 150° C. Solution concentrations were 0.1 g/dl in TCB and 0.1 g/l of 2,6-diterbuthyl-p-chresole were added to prevent degradation. For GPC calculation, a universal calibration curve was obtained using 10 polystyrene (PS) standard samples supplied by Polymer Laboratories (peak molecular weights ranging from 580 to 8500000). A third order polynomial fit was used to interpolate the experimental data and obtain the relevant calibration curve. Data acquisition and processing were done using Empower (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and PB respectively, while the Mark-Houwink exponents $\alpha=0.706$ for PS and $\alpha=0.725$ for PB were used.

For butene-1/ethylene copolymers, it was assumed that the composition was constant in the whole range of molecular weight and the K value of the Mark-Houwink relationship was calculated using a linear combination:

$$K_{EB}=x_E K_{PE}+x_P K_{PB}$$

where $K_{EB}$ was the constant of the copolymer, $K_{PE}$ ($4.06\times10^{-4}$, dL/g) and $K_{PB}$ ($1.78\times10^{-4}$ dl/g) were the constants of polyethylene and polybutene and $x_E$ and $x_B$ were the ethylene and the butene-1 weight % content based upon the weight of the total copolymer. The Mark-Houwink exponents $\alpha=0.725$ were used for the butene-1/ethylene copolymers independently of their composition.

Fractions Soluble and Insoluble in Xylene at 0° C. (XS—0° C.

2.5 g of the polymer sample were dissolved in 250 ml of xylene at 135° C. under agitation. After 30 minutes the solution was allowed to cool to 100° C., still under agitation, and then placed in a water and ice bath to cool down to 0° C. Then, the solution was allowed to settle for 1 hour in the water and ice bath. The precipitate was filtered with filter paper. During the filtering, the flask was left in the water and ice bath so as to keep the flask inner temperature as near to 0° C. as possible. Once the filtering was finished, the filtrate temperature was balanced at 25° C., dipping the volumetric flask in a water-flowing bath for about 30 minutes and then, divided in two 50 ml aliquots. The solution aliquots were evaporated in nitrogen flow, and the residue dried under vacuum at 80° C. until constant weight was reached. If the weight difference between the two residues was equal to or more than 3%, the test was repeated. The percent by weight of polymer soluble (Xylene Solubles at 0° C.=XS 0° C.) was calculated from the average weight of the residues. The insoluble fraction in o-xylene at 0° C. (xylene Insolubles at 0° C.=XI % 0° C.) was:

XI %0° C.=100–XS %0° C.

Fractions Soluble and Insoluble in Xylene at 25° C. (XS—25° C.

2.5 g of polymer were dissolved in 250 ml of xylene at 135° C. under agitation. After 20 minutes the solution was allowed to cool to 25° C., still under agitation, and then allowed to settle for 30 minutes. The precipitate was filtered with filter paper, the solution was evaporated in nitrogen flow, and the residue was dried under vacuum at 80° C. until constant weight was reached. The percent by weight of polymer soluble (Xylene Solubles—XS) and insoluble at room temperature (25° C.) were calculated.

As used herein, the percent by weight of polymer insoluble in xylene at room temperature (25° C.) was considered the isotactic index of the polymer. It is believed that this measurement corresponds to the isotactic index determined by extraction with boiling n-heptane, which by constitutes the isotactic index of polypropylene polymers as the term is used herein.

Determination of Isotactic Pentads Content 50 mg of each sample were dissolved in 0.5 ml of $C_2D_2Cl_4$.

The $^{13}C$ NMR spectra were acquired on a Bruker DPX-400 (100.61 Mhz, 90° pulse, 12 s delay between pulses). About 3000 transients were stored for each spectrum; the mmmm pentad peak (27.73 ppm) was used as the reference.

The microstructure analysis was carried out as described in the literature (Macromolecules 1991, 24, 2334-2340, by Asakura T. et al. and Polymer, 1994, 35, 339, by Chujo R. et al.), incorporated herein by reference.

The percentage value of pentad tacticity (mmmm %) for butene-1 copolymers was the percentage of stereoregular pentads (isotactic pentad) as calculated from the relevant pentad signals (peak areas) in the NMR region of branched methylene carbons (around 27.73 ppm assigned to the BBBBB isotactic sequence), with due consideration of the superposition between stereoirregular pentads and signals, falling in the same region, due to the comonomer.

Determination of X-Ray Crystallinity

The X-ray crystallinity was measured with an X-ray Diffraction Powder Diffractometer using the Cu-Kα1 radiation with fixed slits and collecting spectra between diffraction angle $2\Theta=5°$ and $2\Theta=35°$ with step of 0.1° every 6 seconds.

Measurements were performed on compression molded specimens in the form of disks of about 1.5-2.5 mm of thickness and 2.5-4.0 cm of diameter. These specimens were obtained in a compression molding press at a temperature of 200° C.±5° C. without applying pressure for 10 minutes, then applying a pressure of about 10 kg/cm² for a few seconds and repeating the last operation 3 times.

The diffraction pattern was used to derive the components for the degree of crystallinity by defining a linear baseline for the whole spectrum and calculating the total area (Ta), expressed in counts/sec·2Θ, between the spectrum profile and the baseline. Then an amorphous profile was defined, along the whole spectrum, that separate, according to the two phase model, the amorphous regions from the crystalline ones. The amorphous area (Aa), expressed in counts/sec·2Θ, was calculated as the area between the amorphous profile and the baseline; and the crystalline area (Ca), expressed in counts/sec·2Θ, was calculated as Ca=Ta−Aa. The degree of crystallinity of the sample was then calculated according to the formula:

% Cr=100×Ca/Ta

Example 1 and Comparative Example 1

Materials Used in the Examples

PB-1: butene-1/ethylene copolymer containing 16% by moles of copolymerized ethylene was prepared according to the process disclosed in Patent Cooperation Treaty Publication No. WO2009000637, incorporated herein by reference, and in-line blended with a propylene copolymer composition (I) added in amount of 7% by weight with respect to the total weight of the butene-1/ethylene copolymer and the propylene copolymer composition (I). Such propylene copolymer composition (I) had MFRL of 5.5 g/10 min., total copolymerized ethylene content of 3% by weight, total copolymerized butene-1 content of 6% by weight; XS—25° C. of 19% by weight and $T_m$ of 133° C., and was made of the following two components:
  I') 35% by weight of a copolymer of propylene with ethylene (3.2% by weight in the copolymer), and
  I'') 65% by weight of a copolymer of propylene with ethylene (3.2% by weight in the copolymer) and butene-1 (6% by weight in the copolymer);
  wherein the amounts of I') and I'') were referred to the total weight of I')+I'');
LDPE: low density polyethylene homopolymer Lupolen 3020, having a density of 0.928 g/cm³ and MIE of 4 g/10 min., sold by LyondellBasell;
Stabilizers: blend of 0.05% by weight of pentaerythritol tetrakis(3-(3,5-di-tert-butyl-4-hydroxyphenyl)propionate (Irganox® 1010, sold by BASF) and 0.05% by weight of tris (2.4-di-tert-butylphenyl) phosphite (Irgafos® 168, sold by BASF), the percent amounts being referred to the total weight of the polyolefin composition;
Lubricants: blend of 1% by weight of erucamide (Crodamide® ER, sold by Croda), 1% by weight of Oleamide (Crodamide® OR, sold by Croda) and 1% by weight of Glyceryl Stearate (Atmer® 129, sold by Croda), the percent amounts being referred to the total weight of the polyolefin composition;
Pigment: titanium dioxide Ti-Pure® R-104, sold by DuPont.

No melting peak was detected in the DSC analysis (second scan) of the PB-1.

The materials were melt-blended in a co-rotating twin screw extruder Coperion ZSK40SC, with screw diameter of 40 mm and screw length/diameter ratio of 43:1, under the following conditions:
  extrusion temperature of 180-200° C.;
  screw rotation speed of 220 rpm;
  production rate of 60 kg/hour.

The properties of the final compositions are reported in Table 1.

The properties of the PB-1 (Comparison Example 1) are also reported in Table 1.

TABLE I

| Example | | 1 | Comp. 1 |
|---|---|---|---|
| PB-1 | Weight % | 71.9 | 100 |
| LDPE | Weight % | 24.0 | — |
| Stabilizers | Weight % | 0.1 | — |

TABLE I-continued

| Example | | 1 | Comp. 1 |
|---|---|---|---|
| Lubricants | Weight % | 3 | — |
| Pigment | Weight % | 1 | — |
| Amount of A)* | Weight % | 66.9 | 93 |
| Amount of B)* | Weight % | 24 | — |
| Composition Properties | | | |
| Δ $H_{fus}$ | J/g | 20 | 0 |
| $T_m$ | ° C. | 112.4 | — |
| Shore A | | 70 | 60 |
| Shore D | | <20 | <20 |
| MIE | gr/10' | 2.4 | 1.4 |
| Stress at Break | MPa | 12.5 | 11 |
| Elongation at Break | % | >900 | 790 |
| Compression Set 22 hours 23° C. after 10 min. in autoclave | % | 45 | 32 |
| Compression Set 22 hours 70° C. after10 min. in autoclave | % | 97 | 100 |

Note:
*weight % with respect to the total weight of A) + B).

What is claimed is:

1. A polyolefin composition comprising:
  (A) from 60 to 89% by weight, based upon the total weight of the polyolefin composition, of a copolymer of butene-1 with ethylene having a copolymerized ethylene content of up to 18% by mole based upon the molar composition of the copolymer and no melting peak detectable at the DSC at the second heating scan, and wherein the copolymer of butene-1 with ethylene has a Shore A value equal to or lower than 80; and
  (B) from 11 to 40% by weight, based upon the total weight of the polyolefin composition, of an ethylene polymer having density of from 0.900 to 0.970 g/cm³, measured according to ISO 1183 at 23° C.;
wherein the amounts of A) and B) refer to the total weight of A)+B) and the DSC second heating scan is carried out at a heating rate of 10° C. per minute.

2. The polyolefin composition of claim 1, wherein the composition has a MIE of from 0.5 to 8 g/10 min., wherein the MIE is the melt flow index at 190° C. with a load of 2.16 kg, determined according to ISO 1133.

3. The polyolefin composition of claim 1, wherein the composition has a $\Delta H_{fus}$, measured by DSC at the second heating scan, of from 7 to 35 J/g, wherein the second heating scan is carried out at a heating rate of 10° C. per minute.

4. The polyolefin composition of claim 1, wherein the copolymer of butene-1 and ethylene has a Shore A value from 40 to 80.

5. The polyolefin composition of claim 1, wherein the copolymer of butene-1 and ethylene has at least one of the following additional features:
  a MIE of from 0.5 to 3 g/10 min.;
  a lower limit of the copolymerized ethylene content of 12% by mole based upon the molar composition of the copolymer;
  a Shore A value equal to or lower than 80;
  a Shore D value equal to or lower than 20;
  a Mw/Mn value, where Mw is the weight average molar mass and Mn is the number average molar mass, both measured by GPC, equal to or lower than 3;
  a tension set of less than 30% at 100% of deformation at 23° C. (ISO 2285);
  a percentage of butene-1 units in form of isotactic pentads (mmmm %) greater than 80%;

a tensile stress at break, measured according to ISO 527, of from 3 MPa to 20 MPa;

a tensile elongation at break, measured according to ISO 527, of from 550% to 1000%;

an intrinsic viscosity (I.V.) equal to or higher than 1 dl/g;

a crystallinity of less than 30% measured via X-ray;

a density of 0.895 g/cm$^3$ or less; and a content of xylene insoluble fraction at 0° C. of less than 15% by weight based upon the total weight of the copolymer.

6. The polyolefin composition of claim 1, wherein component B) is selected from the group consisting of HDPE, MDPE, LLDPE, VLDPE, LDPE and their mixtures.

7. The polyolefin composition of claim 6, wherein component B) is a LDPE having a density from 0.914 to 0.935 g/cm$^3$.

8. A manufactured article comprising:
a polyolefin composition comprising
A) from 60 to 89% by weight, based upon the total weight of the polyolefin composition, of a copolymer of butene-1 with ethylene having a copolymerized ethylene content of up to about 18% by mole based upon the molar composition of the copolymer and no melting peak detectable at the DSC at the second heating scan, and
wherein the copolymer of butene-1 with ethylene has a Shore A value equal to or lower than 80; and
B) from 11 to 40% by weight, based upon the total weight of the polyolefin composition, of an ethylene polymer having density of from 0.900 to 0.970 g/cm$^3$, measured according to ISO 1183 at 23° C.;
wherein the amounts of A) and B) refer to the total weight of A)+B) and the DSC second heating scan is carried out at a heating rate of 10° C. per minute.

9. The manufactured article according to claim 8, wherein the article is a gasket.

10. The manufactured article according to claim 8, wherein the article is a twist closure comprising a gasket prepared from the polyolefin composition.

11. The manufactured article according to claim 8, wherein the twist closure is for a food container.

12. The manufactured article according to claim 8, wherein the twist closure is Press-on/Twist-off cap.

* * * * *

UNITED STATES PATENT AND TRADEMARK OFFICE
CERTIFICATE OF CORRECTION

| | |
|---|---|
| PATENT NO. | : 10,793,655 B2 |
| APPLICATION NO. | : 16/087731 |
| DATED | : October 6, 2020 |
| INVENTOR(S) | : Marchini et al. |

It is certified that error appears in the above-identified patent and that said Letters Patent is hereby corrected as shown below:

On the Title Page

Column 1, Item (30), Line 1, delete "16162172" and insert -- 16162172.7 --, therefor Signed and Sealed this
Twenty-second Day of November, 2022

Katherine Kelly Vidal
*Director of the United States Patent and Trademark Office*